United States Patent [19]

Thuliez

[11] Patent Number: 5,584,510
[45] Date of Patent: Dec. 17, 1996

[54] MOTOR VEHICLE CHASSIS

[75] Inventor: Jean-Luc Thuliez, La Neuveville, Switzerland

[73] Assignee: SMH Management Services AG, Biel, Switzerland

[21] Appl. No.: 341,920

[22] Filed: Nov. 16, 1994

[30] Foreign Application Priority Data

Nov. 16, 1993 [FR] France .................. 93 13625

[51] Int. Cl.⁶ .................................................. B62D 21/15
[52] U.S. Cl. .................. 280/784; 280/787; 280/797; 180/65.1
[58] Field of Search .................. 280/781, 783, 280/784, 786, 787, 788, 690, 797–800; 180/311, 312, 65.1

[56] References Cited

U.S. PATENT DOCUMENTS

| D. 56,815 | 12/1920 | Kelso | D21/238 |
|---|---|---|---|
| 1,867,341 | 7/1932 | Werdehoff | 280/800 |
| 1,872,442 | 8/1932 | Goode et al. | 280/787 |
| 2,103,915 | 12/1937 | Probst | 280/787 |
| 3,120,396 | 2/1964 | Nallinger et al. | 280/788 |
| 3,237,959 | 3/1966 | Heyl | 280/786 |
| 3,888,502 | 6/1975 | Felzer et al. | 280/784 |
| 4,167,051 | 9/1979 | Galecke | 441/117 |
| 4,171,730 | 10/1979 | Dow | 180/210 |
| 5,349,722 | 9/1994 | Chayer | 15/353 |
| 5,403,123 | 4/1995 | Walters | 405/286 |

FOREIGN PATENT DOCUMENTS

| 756447 | 12/1933 | France . | |
| 141543 | 4/1935 | Germany | 280/787 |
| 662373 | 9/1936 | Germany . | |
| 1262138 | 2/1968 | Germany . | |
| 9217503 | 9/1993 | Germany . | |
| WO9217349 | 10/1992 | WIPO . | |

*Primary Examiner*—Paul N. Dickson
*Attorney, Agent, or Firm*—Sughrue, Mion, Zinn, Macpeak & Seas

[57] ABSTRACT

The invention concerns a chassis (1) of the beam type for a motor vehicle comprising a central beam (4), characterised in that it comprises at least one elongated member (6, 8) attached to said central beam (4) and extending substantially parallel to said central beam (4), and in that the end portions (6a, 6b, 8a, 8b) of said elongated member (6, 8) extend beyond the ends (4a, 4b) of said central beam (4) at the front and the rear of said chassis (1) and are arranged to be deformed and to absorb energy in case of a collision.

10 Claims, 3 Drawing Sheets

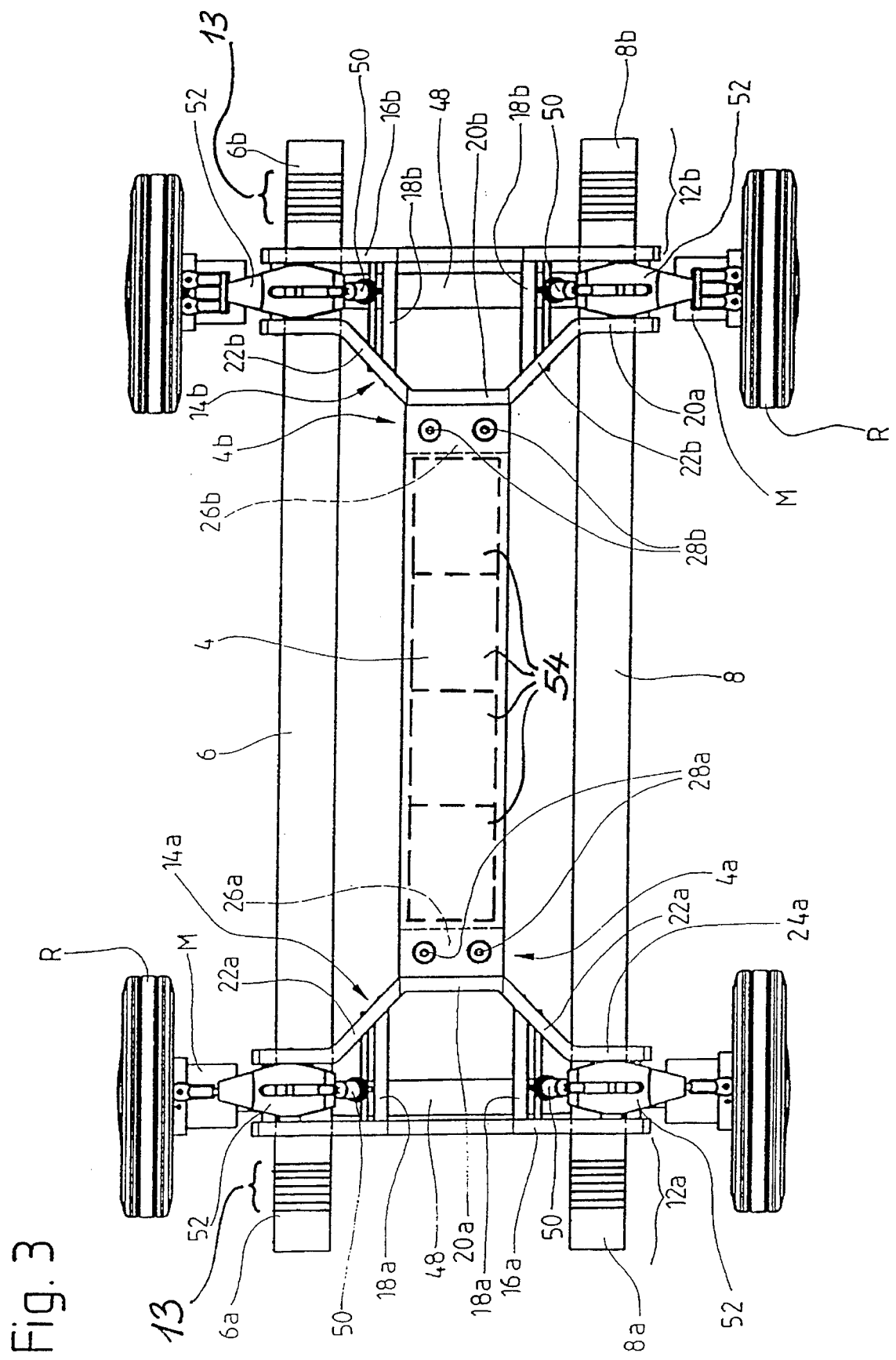

MOTOR VEHICLE CHASSIS

BACKGROUND OF THE INVENTION

The present invention relates to a motor vehicle chassis and in particular a chassis of a beam type exhibiting high passive security characteristics in case of an impact.

Motor vehicle chassis comprising a central steel beam with a very strong section onto which the members supporting the principal organs and the body of the vehicle are attached are already known.

This type of chassis, called hereinafter a beam type chassis, has, however, numerous disadvantages due in particular to its great weight which requires significant power to set it into motion and to its great rigidity which obstructs deformation which is essential for the absorption of energy in case of an impact. Indeed, no part of the chassis is designed to absorb the impact energy produced in the event of an accident so that the whole of this energy is transmitted to the occupants via the passsenger space of the vehicle.

These disadvantages subsequently led to the development of a new type of vehicle in which the chassis and the body are combined. This chassis-body assembly, which is still used today, is called a monoshell or self-supporting body, and includes a chassis-frame formed of a certain number of elements of pressed sheet metal welded together and a superstructure formed in the same manner and assembled either in a rigid or elastic way on the chassis-frame.

Although this type of chassis offers a good compromise between lightness and rigidity, giving it advantageous safety features, it has, however, a large number of pieces that have to be assembled during numerous welding operations, which even if they are performed by robots, make the manufacturing costs of the chassis-frame high. This is why research is constantly carried out to provide the public with a simple motor vehicle chassis with increased safety features.

SUMMARY OF THE INVENTION

A purpose of the invention is thus to overcome the disadvantages of the above-mentioned prior art by providing a motor vehicle chassis of the beam type, of simple construction and offering safety and lightness characteristics compatible with the current requirements of the market.

The invention thus concerns a beam type chassis for a motor vehicle comprising a central beam, characterised in that it also includes at least one elongated member attached to said central beam and extending substantially parallel to said central beam, and in that the end portions of said elongated member extend beyond the ends of said central beam at the front and at the rear of said chassis and are arranged to be deformed and to absorb energy in case of a collision.

Thanks to these characteristics, the portion of the elongated member extending beyond the ends of the central beam of the chassis can be deformed and absorb energy in case of a frontal collision, thereby reducing the quantity of energy transmitted to the passenger space which is supported by the central beam.

According to a preferred embodiment of the invention, the chassis comprises two elongated members extending on both sides of said central beam.

This symmetrical configuration with two elongated members enables, on the one hand, the stability of the vehicle to be improved and, on the other hand, the safety of the occupants to be increased in case of a collision. Further, the use of these two members enables the central beam section to be reduced and thus the weight of the chassis to be reduced without affecting its rigidity.

Other advantages and characteristics of the invention of the present invention will become clear upon reading the following description of an example of a particular embodiment, said description being made purely by way of illustrative and non-limitative example in conjunction with the annexed drawings, in which:

BRIEF DESCRIPTION OF THE DRAWINGS

FIGS. 2 and 3 are respectively top and front views of the chassis of FIG. 1.

DESCRIPTION OF PREFERRED EMBODIMENTS

Figure 1:
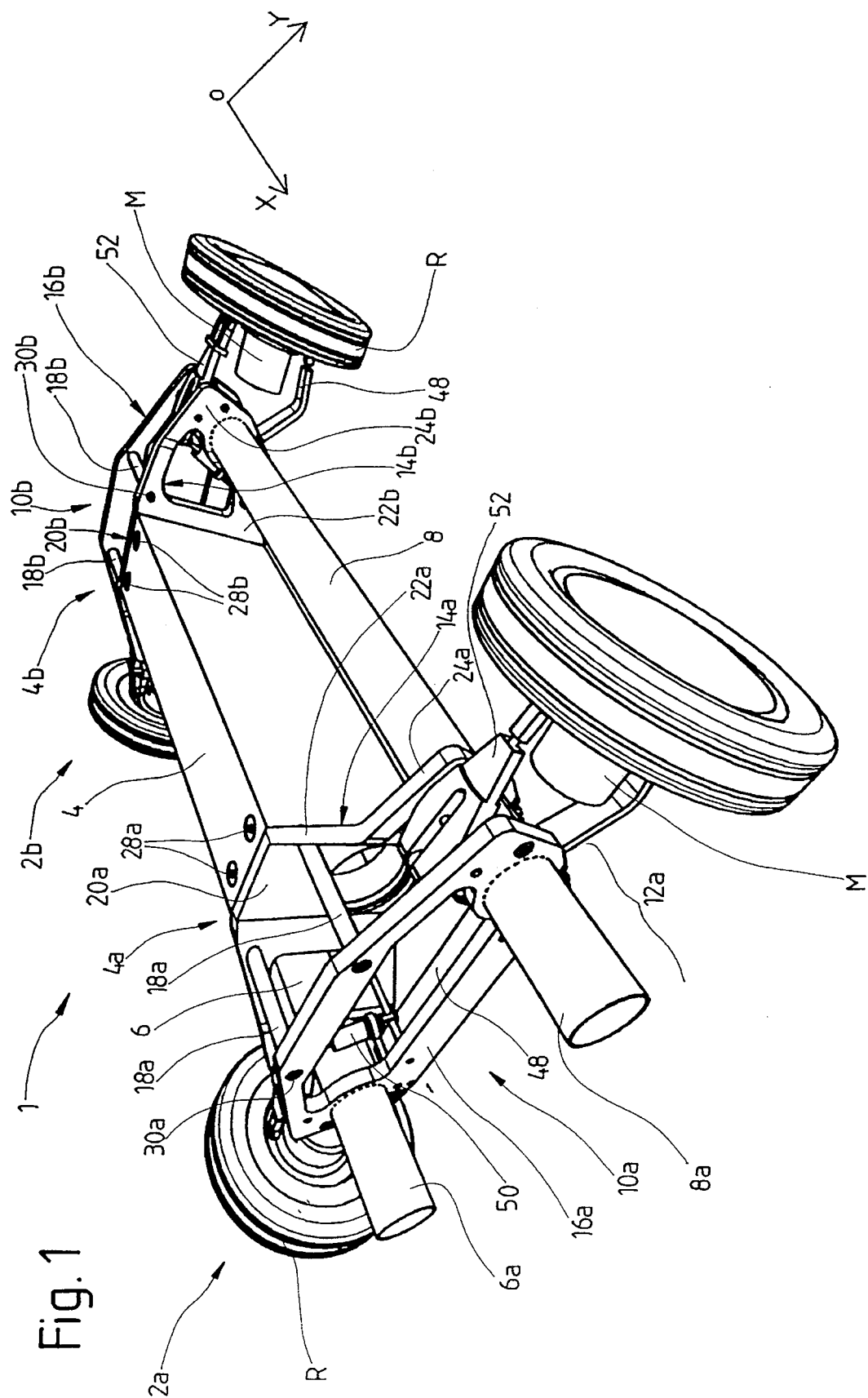
FIG. 1 is a perspective view of an example of an embodiment of a beam type chassis according to the invention.

FIG. 1 shows a chassis according to the invention, designated by the general numerical reference 1. Chassis 1 is intended in the example illustrated, to equip an electric traction vehicle with four wheel drive, each of said wheels R being driven by an electric motor M and is in particular intended to support the passenger space (not shown) of the vehicle.

In order to facilitate understanding of the invention the front under carriage 2a and the rear undercarriage 2b of such a vehicle have been shown mounted on chassis 1. In the present description the front undercarriage and the rear undercarriage will be defined to mean the assembly of members which, on the one hand, support the vehicle starting with the chassis, and which, on the other hand, ensure the vehicle suspension and shock absorption, including the wheels R. These members and their arrangement on chassis 1 of the invention will be described in more detail below.

Chassis 1 is of the beam type and comprises a central beam 4 at the ends of which are fixed respectively front undercarriage 2a and rear undercarriage 2b. Central beam 4 has the configuration of a hollow beam which, in the example described, exhibits a rectangular cross-section whose major axis extends perpendicular to the plane of chassis 1, or, in other words, perpendicular to the surface on which the vehicle equipped with the chassis is intended to circulate. Central beam 4 is of such a size as to ensure in particular the flexion and torsion rigidity of the vehicle in relation to the rolling axis (axis OX in the drawing) and in relation to the pitching axis (axis OY in the drawing) of the vehicle which the chassis is intended to equip. Further, central beam 4 delimits the length of the theoretically rigid part of the chassis above which the occupants of the vehicle are situated.

Chassis 1 also includes two elongated members 6 and 8 which extend parallel to central beam 4 on either side of the latter. Elongated members 6 and 8 are also formed by hollow beams having a circular section.

It is of course clear that a man skilled in the art will, according to alternative embodiments, also be able to select other appropriate section forms.

Each elongated member 6, 8 comprises front end portions 6a, 8a and rear end portions 6b, 8b by which it is fixed to central beam 4 (FIG. 3).

More precisely, each elongated member 6, 8 is connected to central beam 4 by front support means 10a and rear support means 10b fixed respectively to its front end 4a and rear end 4b. Support means 10a and 10b extend substantially perpendicular to the longitudinal direction of central beam 4.

According to an important characteristic of the chassis of the invention, end portions 6a, 6b and 8a, 8b extend beyond front and rear ends 4a and 4b of central beam 4 and beyond support means 10a and 10b. End portions 6a, 6b and 8a, 8b of elongated members 6 and 8 thus determine absorption zones 12a, 12b, respectively at the front and the rear, which are intended to absorb, by the deformation of elongated members 6, 8 notably along the longitudinal direction of chassis 1, the energy produced in the event of a frontal or rear collision with another vehicle or a fixed obstacle so as to ensure the safety of the occupants of the vehicle equipped with a chassis according to the invention.

In order to facilitate compressed deformation in the longitudinal direction of end portions 6a and 6b, the ends of tubes 6 and 8 each comprise deformation initiating means or local weaknesses provided, for example, in the form of a series of fine parallel annular grooves 13.

According to an alternative embodiment, further improving the absorption effect of tubes 6, 8, end portions 6a, 6b and 8a, 8b may be filled with a compressible material such as an appropriate synthetic material.

Figure 2:
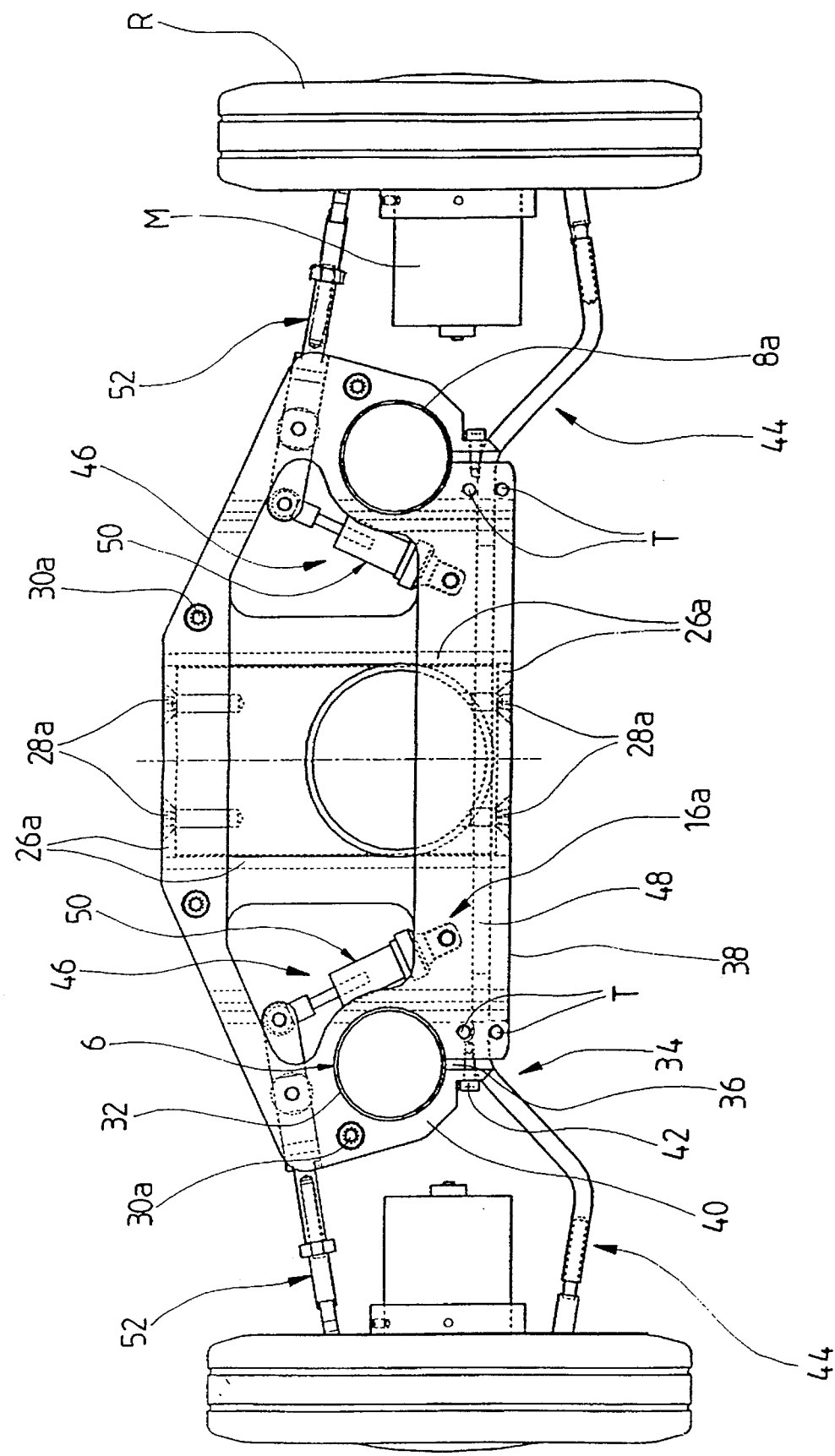

As is shown in FIGS. 2 and 3, front and rear support means 10a, 10b each comprises two plates 14a, 16a, and 14b, 16b arranged in a substantially parallel manner. Plates 14a and 14b are respectively attached to front and rear ends 4a and 4b of central beam 4 whilst plates 16a and 16b are respectively attached to plates 14a and 14b and are separated from the latter by means of a plurality of spacers of which only spacers 18a and 18b, clearly visible in the drawing, have been referenced.

Plates 14a and 14b each comprise a central section respectively 20a and 20b which extends substantially perpendicular to the longitudinal direction of the chassis and on each side of which extend laterally and inclining respectively towards the front and the rear, two intermediate sections 22a and 22b which are prolonged laterally by end sections 24a and 24b extending parallel to central section 20a, 20b.

Plates 16a, 16b each have the configuration of a flat plate which extends parallel to the central sections respectively 20a and 20b and to the end sections respectively 24a, 24b.

In the embodiment example illustrated, the fixing of plates 14a, 14b onto central beam 4 is achieved by embedding respectively in ends 4a and 4b of central beam 4. Central sections 20a, 20b of plates 14a, 14b each therefore comprise ribs 26a, 26b, which once the plates are mounted, are extended and embedded inside ends 4a, 4b of central tube 4. Embedded ribs 26a, 26b are attached to the beam by means of bolts 28a, 28b shown schematically in the drawings.

Plates 16a, 16b are also each fixed to their respective plate 14a, 14b by spacers 18a, 18b by bolts 30a, 30b also shown schematically.

In this example, each elongated member 6, 8 extends across four openings of four brackets in a line arranged respectively next to the lateral edges of plates 14a, 16a and 14b, 16b. Only one opening 32 of one bracket 34 arranged in plate 16a visible in FIG. 2 has been referenced, the other brackets of this plate and plates 14a, 14b and 16b which are not referenced, being identical. Plate 16a includes a slit 36 which extends from its lower edge 38 and which juts into opening 32 so that the part 40 of the lateral edge of plate 16a forms an elastic lug which can be pressed onto the elongated member, in this case onto tube 6, for example, by the use of a screw 42.

It goes without saying that the structure of support means 10a, 10b of the chassis of the invention may be different from that which has just been described and which is formed of two parallel plates connected by spacers secured by bolts and a man skilled in the art will easily be able to provide for example support means each comprising a single plate in an appropriate form for receiving the different organs of a front or rear undercarriage or even support means each comprising two plates, which may or may not be parallel, coming from a single piece by casting.

Central beam 4, elongated members 6, 8 and support means 10a, 10b may be produced by any of the different known means using any of the suitable known materials. In an advantageous manner, said material is aluminium or an aluminium alloy and central beam 4 and elongated members 6, 8 are formed by extrusion and support means 10a, 10b by casting. With this material an advantageous compromise can be achieved between the rigidity and lightness of the chassis. Further, it will be noted that plates 14a, 14b, 16a and 16b comprise hollows for weight reduction purposes.

In the example shown, support means 10a, 10b of the chassis according to the invention are suited to receiving suspension means 44 and absorption means 46. The latter are mounted between each pair of front plates 14a, 16a, and rear plates 14b, 16b, and said means 44 and 46 form respectively with the two pairs of plates a part of front undercarriage 2a and rear undercarriage 2b.

As is seen particularly in FIG. 2, each of suspension means 44 has the configuration of an elastic strip 48 called a Bertin strip whose ends are attached to wheels R via steering knuckles brackets (not shown) and whose central part, which extends between front plates 14a and 16a and rear plates 14b and 16b is maintained in the direction of the height of the chassis with a side clearance by two pairs of rods T attached to the plates.

In the example shown, independent absorption means 46 are used with each wheel R and each comprise a cylinder and piston type shock absorber 50 articulated by a first end between plates 14a and 16a and 14b and 16b respectively and by a second end on the end of a connecting rod 52 articulated in its centre between said plates and whose other end is attached to the steering knuckle bracket.

Of course, support means 10a, 10b of the chassis of the invention may form means for anchoring other functional organs of a vehicle such as the steering, bodywork etc.

It will be noted that chassis 1 of the invention is particularly well suited to use with electric traction vehicles in that central tube 4 may be used advantageously as means for housing the vehicle batteries 54 which also contributes to the lowering of the vehicle's centre of gravity.

Further, although the chassis of the invention is particularly suited to equip electric traction vehicles, in view of its lightness, this chassis may advantageously equip heat engines and hybrid electric and heat traction vehicles. In such case, and as the pairs of plates 14a, 16a and 14b, 16b have the configuration of a cradle, one of said pairs, for example, may advantageously receive the heat engine which ensures, directly or indirectly, the propulsion of the vehicle.

It will be noted that the structure of the chassis according to the invention enables the easy adjustment of the length of parts 6a, 6b, 8a, 8b of elongated members 6, 8 which extend beyond the ends of central beam 4 and thus the adjustment of the energy absorption capacity of the vehicle in case of frontal or rear impact to respond to standards which vary according to the country or to obtain a constant chassis energy absorption capacity whatever the weight of the vehicle, for example in the event that the chassis equips a vehicle whose traction may be transformed over time for example from totally heat traction to hybrid traction.

It will be noted that contrary to conventional monoshell type chassis structures in folded welded sheet metal, the chassis according to the invention comprises no welding but is formed of an assembly by the bolting of symmetrical pieces. The use of bolts for the assembly of the different elements of this chassis makes it easy to dismantle and enables certain elements to be replaced if required, in particular the elongated members, if they are deformed following an impact.

What is claimed is:

1. In a chassis for a motor vehicle comprising front and rear wheels, and suspension means and damping means for said wheels, said chassis comprising a central beam, having a length, and a plurality of support means attached respectively to opposite ends of said central beam and extending substantially perpendicular to a longitudinal direction of said central beam, said support means being adapted to carry said suspension means, the improvement wherein said chassis further comprises:

at least two elongated hollow beams spaced from and attached to said central beam and extending substantially parallel to said central beam, wherein said at least two elongated hollow beams are attached to said plurality of support means, and wherein opposite ends of each of said at least two elongated hollow beams are deformable and extend beyond said opposite ends of said central beam at a front and a rear of said chassis;

wherein said at least two elongated hollow beams extend along either side of said central beam;

wherein said opposite ends of said at least two elongated hollow beams extend into said support means and beyond;

wherein each of said opposite ends of said at least two elongated hollow beams comprises deformation initiating means in the longitudinal direction; and wherein said central beam has means for housing batteries.

2. The chassis according to claim 1, wherein each of said support means comprises a pair of two substantially parallel plates, only one of said plates being attached to one of said ends of said central beam and being separated from the other of said plates by spacers, there thus being first and second pairs of said plates.

3. The chassis according to claim 2, wherein said elongated hollow beams are fixed onto the plates by fastening means.

4. The chassis according to claim 1, wherein said elongated hollow beams have a circular section.

5. The chassis according to claim 1, wherein the central beam has the configuration of a hollow beam having a rectangular section, the major axis of said rectangular section extending perpendicular to a plane of the chassis.

6. The chassis according to claim 1, which is made of aluminium or of an aluminium alloy.

7. The chassis according to claim 2, wherein said first and second pairs of said plates are for mounting said suspension means and said damping means for said front and rear wheels, respectively.

8. The chassis according to claim 7, wherein one of the pairs of plates forms a cradle adapted to receive propulsion means for the vehicle.

9. In a chassis for an electrically propelled vehicle having a propulsion motor energized by batteries, said chassis comprising a central beam, having a length and a plurality of support means attached respectively to opposite ends of said central beam and extending substantially perpendicular to a longitudinal direction of said central beam, said support means being adapted to carry said suspension means, the improvement wherein said chassis further comprises:
      two elongated beams spaced from and attached to said central beam and extending substantially parallel to said central beam, wherein said two elongated beams are attached to said plurality of support means, wherein opposite ends of each of said two elongated beams are deformable and extend beyond the opposite ends of said central beam at a front and a rear of said chassis, and are deformable to absorb energy in case of a collision of the vehicle, wherein said two elongated beams extend along either side of said central beam;

wherein said opposite ends of said two elongated beams extend into said support means and beyond;

wherein each of said opposite ends of said two elongated beams comprises deformation initiating means in the longitudinal direction;

wherein the central beam has a configuration of a hollow beam having a rectangular section, the major axis of said rectangular section extending perpendicular to a plane of the chassis, and wherein the central beam has means for housing said batteries (54).

10. A chassis according to claim 9, wherein the beam is made of aluminium or an aluminium alloy.

* * * * *